(12) United States Patent
Sato

(10) Patent No.: US 8,710,783 B2
(45) Date of Patent: Apr. 29, 2014

(54) MOTOR CONTROL SYSTEM, MOTOR CONTROL DEVICE, AND BRUSHLESS MOTOR

(71) Applicant: Panasonic Corporation, Osaka (JP)

(72) Inventor: Daisuke Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/009,562

(22) PCT Filed: Apr. 24, 2013

(86) PCT No.: PCT/JP2013/002769
§ 371 (c)(1),
(2), (4) Date: Oct. 3, 2013

(87) PCT Pub. No.: WO2013/171984
PCT Pub. Date: Nov. 21, 2013

(65) Prior Publication Data
US 2014/0084832 A1     Mar. 27, 2014

(30) Foreign Application Priority Data

May 15, 2012    (JP) .................................. 2012-111231

(51) Int. Cl.
*H02P 1/00*       (2006.01)
*H02P 3/00*       (2006.01)
(52) U.S. Cl.
USPC ... 318/452; 318/438; 318/400.04; 318/400.3; 318/400.12
(58) Field of Classification Search
USPC ............. 318/400.04, 400.12, 400.3, 452, 438
See application file for complete search history.

(56) References Cited

U.S. PATENT DOCUMENTS 5,541,484 A * 7/1996 DiTucci ................... 318/400.04
5,844,388 A * 12/1998 Maiocchi ................. 318/400.12
5,877,950 A * 3/1999 Bonsignour et al. ............ 363/98

(Continued)

FOREIGN PATENT DOCUMENTS

| JP | 6-34131 U | 5/1994 |
| JP | 07-52689 A | 2/1995 |
| JP | 11-262299 A | 9/1999 |
| JP | 2011-132853 A | 7/2011 |

OTHER PUBLICATIONS

International Search Report for PCT/JP2013/002769, Jun. 18, 2013.

*Primary Examiner* — Paul Ip
(74) *Attorney, Agent, or Firm* — RatnerPrestia

(57) ABSTRACT

A motor control system includes a host ECU and a motor control device. The host ECU controls a wheel driving unit. A power supply to the ECU is halted when an IG switch is turned OFF. The motor control device receives a PWM command signal from the host ECU and controls a motor of a cooling blower. The host ECU modulates a duty ratio of pulses of the PWM command signal by a target rotating speed of the motor, modulates a period of the pulses of the PWM command signal by a continuous operation time of the motor, and transmits the result to the motor control device. The motor control device reconstructs both the target rotating speed and the continuous operation time, and controls rotating speed of the motor from the received PWM command signal. Moreover, the motor control device halts rotation of the motor when a signal-unreceiving time period of the PWM command signal becomes larger than the continuous operation time.

5 Claims, 7 Drawing Sheets

(56) References Cited

U.S. PATENT DOCUMENTS

| | | | | |
|---|---|---|---|---|
| 6,049,474 | A * | 4/2000 | Platnic | 363/98 |
| 6,137,247 | A | 10/2000 | Maehara et al. | |
| 6,246,208 | B1 * | 6/2001 | Gatti | 318/801 |
| 6,593,751 | B2 * | 7/2003 | Takahashi | 324/551 |
| 6,984,953 | B2 * | 1/2006 | Quirion et al. | 318/400.3 |
| 7,061,195 | B2 * | 6/2006 | Ho et al. | 318/438 |
| 7,274,241 | B2 * | 9/2007 | Ho et al. | 327/381 |
| 7,339,344 | B2 * | 3/2008 | Borisavljevic et al. | 318/723 |
| 7,348,758 | B2 * | 3/2008 | Ho | 318/811 |
| 7,405,528 | B2 * | 7/2008 | Ho et al. | 318/400.25 |
| 7,619,385 | B2 * | 11/2009 | Suzuki et al. | 318/705 |
| 7,759,897 | B2 * | 7/2010 | Piippo | 318/700 |
| 8,362,759 | B2 * | 1/2013 | Ha et al. | 324/76.15 |
| 8,624,532 | B2 * | 1/2014 | Chuah et al. | 318/400.04 |
| 2001/0048310 | A1 * | 12/2001 | Takahashi | 324/551 |
| 2004/0130923 | A1 * | 7/2004 | Yin Ho et al. | 363/131 |
| 2006/0119303 | A1 * | 6/2006 | Ho et al. | 318/438 |
| 2006/0279248 | A1 * | 12/2006 | Borisavljevic | 318/723 |
| 2007/0024232 | A1 * | 2/2007 | Suzuki et al. | 318/812 |
| 2007/0046246 | A1 * | 3/2007 | Borisavljevic | 318/723 |
| 2007/0090785 | A1 * | 4/2007 | Ho | 318/812 |
| 2008/0169782 | A1 * | 7/2008 | Piippo | 318/715 |
| 2010/0148753 | A1 * | 6/2010 | Ha et al. | 324/107 |
| 2013/0043814 | A1 * | 2/2013 | Chuah et al. | 318/400.04 |

* cited by examiner

MOTOR CONTROL SYSTEM, MOTOR CONTROL DEVICE, AND BRUSHLESS MOTOR This application is a U.S. National Phase Application of PCT International Application PCT/JP2013/002769, filed Apr. 24, 2013.

TECHNICAL FIELD

The present invention relates to motor control systems for use in cooling blowers, motor control devices, and brushless motors.

BACKGROUND ART

Hybrid vehicles and electric ones are each incorporated with a large battery (a main battery) for driving the vehicles per se, and each use an air cooling blower to cool the battery. The large battery must be subjected to a certain cooling not only during driving of the vehicle but also after the vehicle has stopped and an ignition switch thereof has been turned off, depending on the situation thereof immediately before the turning off. Such the cooling blower is controlled in accordance with an instruction received from an electronic control unit, called as an ECU (Electronic Control Unit), which controls a wheel driving unit including an engine. The instruction is made including a cooling capacity (e.g. the rotation number of its fan) and cooling period (e.g. a rotation duration time of the fan) of the cooling blower. However, there is a problem that, when the ignition switch is turned off to halt power supply to the electronic control unit, transmission of the instruction on cooling to the cooling blower is normally halted.

Conventionally, in order to address the problem in a conventional vehicle with an engine, the following technique has been proposed to prevent damage to the engine from overheating. That is, in the technique, there are included a load detecting means for detecting loads of the engine, a cooling water temperature detecting means for detecting the temperature of cooling water of the engine, and a driving means for driving such as an electric cooling pump and an electric cooling fan. Then, after the engine has been halted, the driving means is allowed to operate by supplying electric power for a certain period of time to the driving means, in accordance with the loads of the engine and the temperature of the cooling water, from the battery via a relay or the like without via the electronic control unit (see Patent Literature 1, for example).

However, the conventional technique described above requires additional components, such as interconnections and relays, which are needed for transmitting information to the driving means from the load detecting means, the cooling water temperature detecting means, and the like. Moreover, another method can also be considered in which the electronic control unit is caused to continue to operate by supplying it with electric power even after the engine has been halted, and then the electronic control unit operates a relay by itself to halt the power supplying after a lapse of a certain time from the engine halting. However, this case is expected to also require an additional relay and to suffer from possible failures that, for example, the contacts of the relay would fuse together. Moreover, because the electronic control unit is basically intended to control the wheel driving means, the control unit has a large amount of power consumption. Therefore, use of the electronic control unit for controlling the cooling blower results in an excessive amount of power consumption.

CITATION LIST

Patent Literature

Patent Literature 1: Unexamined Japanese Utility Model Publication No. H06-34131

SUMMARY OF THE INVENTION

A motor control system according to the present invention includes a host controller and a motor control device. The host controller controls a wheel driving unit of a vehicle, with the controller being supplied with electric power which will be halted upon turning off of an ignition switch. The motor control device receives a PWM command signal from the host controller, and controls a motor of a cooling blower for cooling a power supply unit which supplies electric power to the wheel driving unit. The host controller modulates a duty ratio of pulses of the PWM command signal by a target rotating speed of the motor, modulates a period of the pulses of the PWM command signal by a continuous operation time of the motor, and then transmits the modulated PWM command signal to the motor control device. The motor control device demodulates the received PWM command signal to reconstruct both the target rotating speed and the continuous operation time. The motor control device controls a rotating speed of the motor based on the target rotating speed, and controls the motor to halt rotation when a signal-unreceiving time period of the PWM command signal becomes larger than the continuous operation time.

This configuration allows the appropriate cooling of the power supply unit that supplies the electric power to the wheel driving unit, even after the ignition switch has been turned off. This also allows the motor control system for the cooling blower, which features the simple configuration, a low price, and less power consumption.

Moreover, the motor control system according to the present invention is one that receives the PWM command signal from the host controller, and controls the motor of the cooling blower. The motor control system includes a PWM signal processor which outputs the target rotating speed based on the PWM command signal, a position detecting unit which detects a rotating position of a rotor of the motor and outputs a position detection signal, a rotating speed calculating unit which calculates the rotating speed of the motor based on the position detection signal and outputs a detected rotating speed, a rotation controller which outputs a driving signal based on the target rotating speed and the detected rotating speed, and an energization driving unit which energizes the motor to drive based on the driving signal. Then, the PWM signal processor reconstructs the target rotating speed from the duty ratio of the pulses of the PWM command signal, and reconstructs the continuous operation time from the period of the pulses of the PWM command signal. Also, the PWM signal processor supplies, to the rotation controller, the target rotating speed with which the rotation of the motor is halted, when the signal-unreceiving time period of the PWM command signal becomes larger than the continuous operation time.

This configuration allows the appropriate cooling of the power supply unit that supplies the electric power to the wheel driving unit, even after the ignition switch has been turned off.

This also allows the motor control system for the cooling blower, which features the simple configuration, a low price, and less power consumption.

Moreover, in the motor control device according to the present invention, the PWM signal processor includes a period detecting unit which detects the period of the pulses of the PWM command signal, a duty ratio detecting unit which detects the duty ratio of the pulses of the PWM command signal, a continuous operation time calculating unit which calculates the continuous operation time based on the period of the pulses, a target rotating speed calculating unit which calculates the target rotating speed based on the duty ratio of the pulses, a time measuring unit which measures the signal-unreceiving time period during which the PWM command signal is not inputted, and a target rotating speed commanding unit which outputs the target rotating speed with which the rotation of the motor is halted, when the signal-unreceiving time period becomes larger than the continuous operation time.

Moreover, a brushless motor according to the present invention includes a rotor, a stator equipped with a three-phase winding, and the motor control device described above that energizes and drives the winding.

In this way, in accordance with the present invention, it is possible to provide the motor control system, the motor control device, and the brushless motor, all intended for the cooling blower, which are capable of providing the appropriate cooling of the in-vehicle battery, featuring the simple configuration and low power consumption.

DESCRIPTION OF EMBODIMENTS

Hereinafter, descriptions will be made regarding embodiments of the present invention with reference to the accompanying drawings.

Exemplary Embodiment

Figure 1:
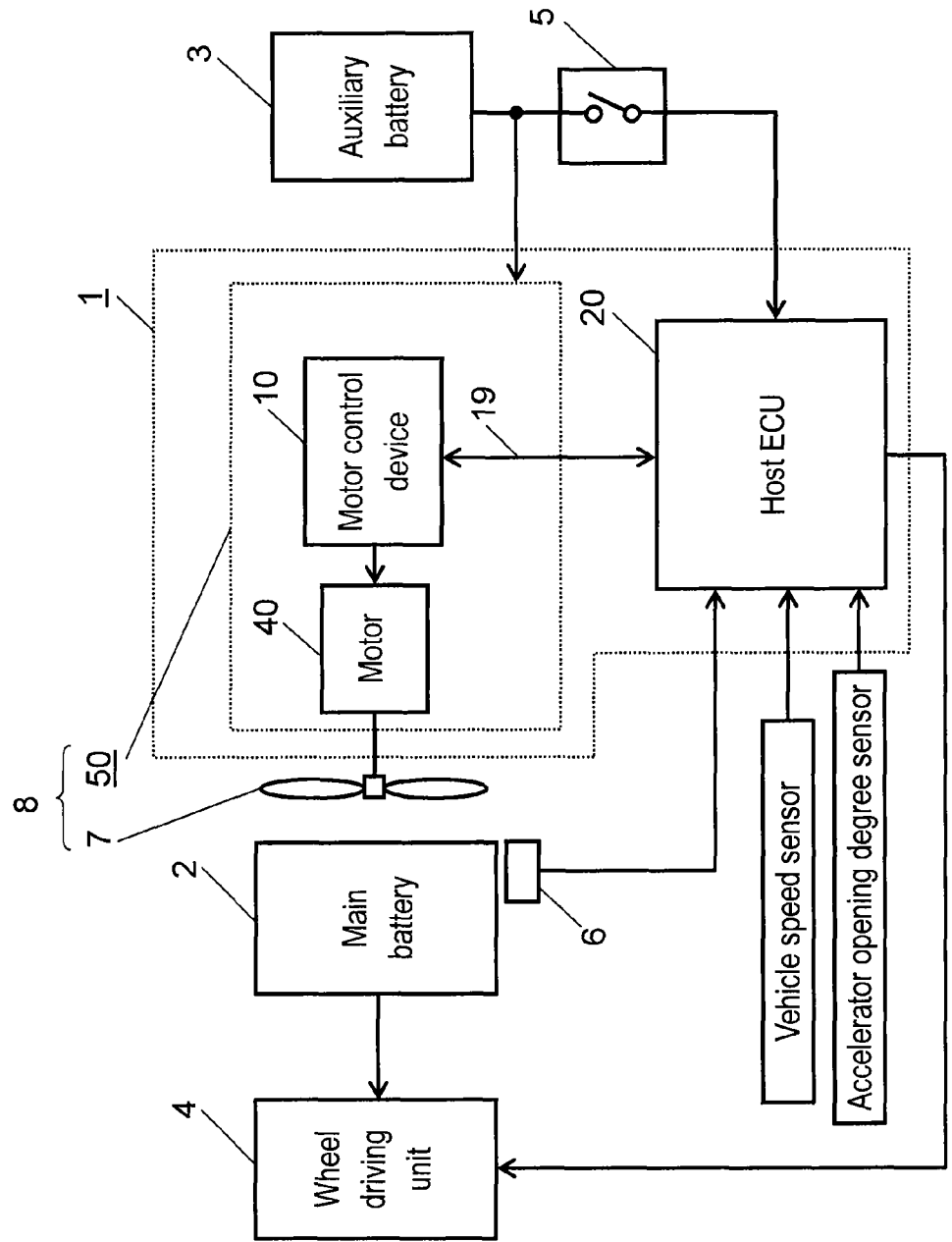
FIG. 1 is a block diagram of a control system of a vehicle including a motor control system according to an embodiment of the present invention.

FIG. 1 is a block diagram of a control system of a vehicle including a motor control system according to an embodiment of the present invention. FIG. 1 shows an exemplary configuration focusing on a cooling blower of an electric vehicle, hybrid vehicle, or the like, and control of the blower. A wheel driving unit such as a wheel driving motor of the vehicle is supplied with electric power from main battery 2 serving as a power supply unit. Cooling blower 8 is configured with brushless motor 50 and fan 7 that is rotationally driven by brushless motor 50. Main battery 2 is cooled by air blown from cooling blower 8. Brushless motor 50 is configured with motor 40 and motor control device 10 that controls the rotation of motor 40. Cooling capacity of cooling blower 8 is determined from a rotating speed of motor 40. The rotating speed of motor 40 is controlled by motor control device 10, through reception of a command signal from host controller (hereinafter, referred to as host ECU) 20.

Host ECU 20 also controls wheel driving unit 4, an air conditioner (not shown) inside the vehicle, and the like, based on information from a vehicle speed sensor and an accelerator opening degree sensor. Moreover, host ECU 20 controls the cooling capacity of cooling blower 8 based on information from temperature sensor 6 that detects the temperature of main battery 2. Specifically, host ECU 20 transmits, to motor control device 10, information of a target rotating speed of motor 40, by means of a PWM signal via PWM signal line 19. Note that the rotating speed of motor 40 as referred herein is the rotation number per unit of time of motor 40.

Host ECU 20 and brushless motor 50 are supplied with electric power from auxiliary battery 3, separately from main battery 2. Note that, in addition to host ECU 20 and brushless motor 50, auxiliary battery 3 supplies electric power to other in-vehicle modules as well including a radio. Here, host ECU 20 is configured including a microcomputer, ROM, and RAM. The host ECU employs high performance components, most notably the microcomputer, because it is required to provide a highly-accurate control of wheel driving unit 4. For this reason, host ECU 20 has a large amount of power consumption. Consequently, for achieving the lower power consumption, the power supply to host ECU 20 is halted to reduce its power consumption when there is no need for the control by host ECU 20. For that purpose, host ECU 20 is coupled with auxiliary battery 3 via ignition switch (referred to as IG switch, hereinafter) 5. Then, the power is always supplied during driving, that is, in the state of IG switch 5 being turned on (referred to as ON, hereinafter), whereas the power supply is halted during a stop, that is, in the state of IG switch 5 being turned off (referred to as OFF, hereinafter). On the other hand, brushless motor 50 is coupled directly with auxiliary battery 3 because it is necessary to cool main battery 2 even in the state of IG switch 5 being OFF. Although motor control device 10 includes a microcomputer, the microcomputer of motor control device 10 is set to be in a sleep mode when no command signal is received from host ECU 20, so as to reduce its power consumption as much as possible.

Figure 2:
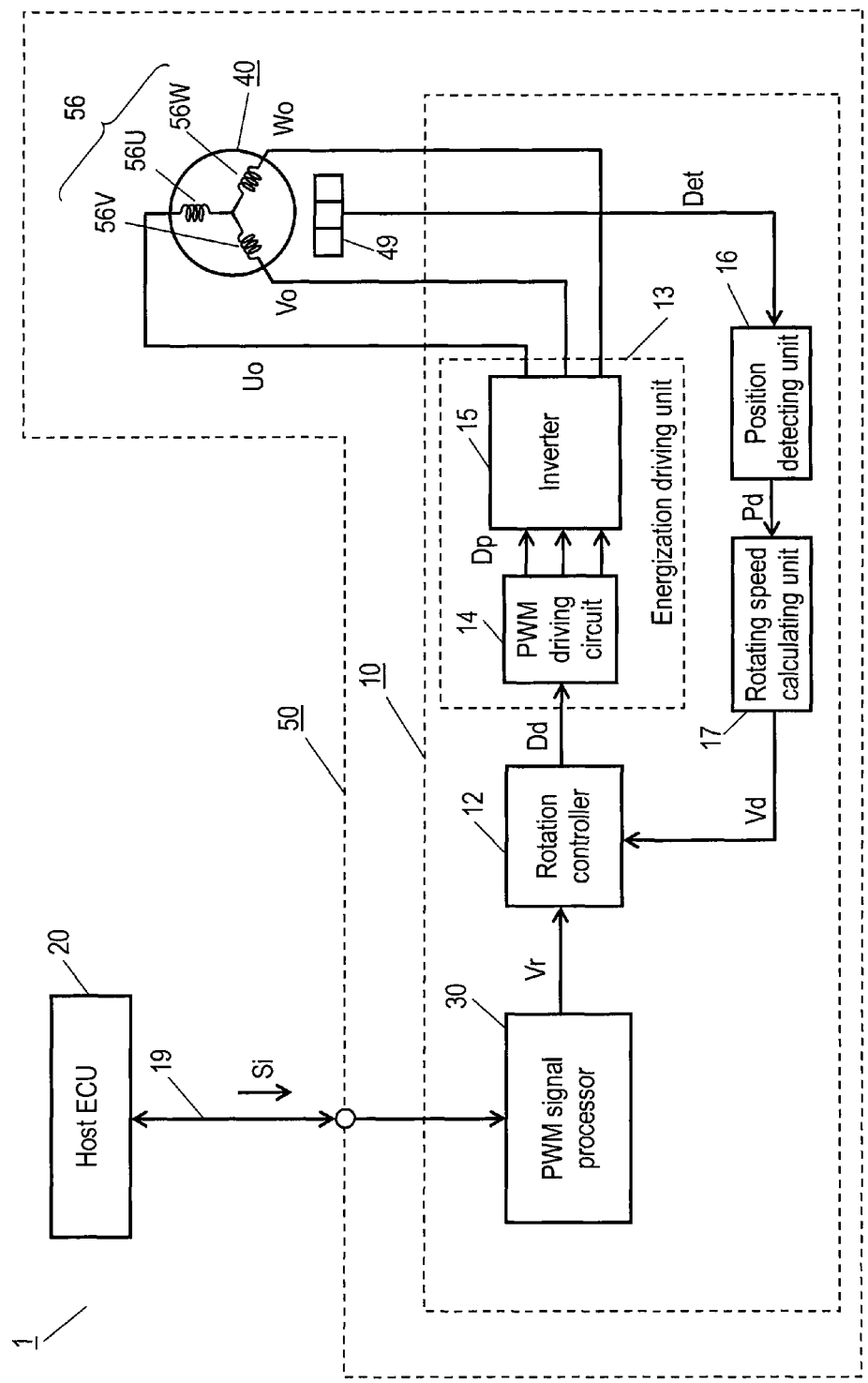
FIG. 2 is a block diagram of a configuration of the motor control system according to the embodiment of the invention.

Next, descriptions will be made regarding a configuration and operations of motor control system 1, with reference to FIGS. 2 to 5. FIG. 2 is a block diagram of the configuration of the motor control system according to the embodiment of the present invention.

As shown in FIG. 2, motor control system 1 according to the embodiment is configured including brushless motor 50 and host ECU 20 that controls brushless motor 50. Moreover, in the embodiment, brushless motor 50 is configured to mount circuit components thereon which configure motor control device 10; however, details of this will be described later. That is, as shown in FIG. 2, in brushless motor 50, motor control device 10 controls the driving of motor 40.

Motor 40 includes a rotor and a stator having windings 56, and the rotor is rotated by energizing windings 56 to drive. In the embodiment, descriptions are made using brushless motor 50, as an example, where motor 40 is driven on a three-phase current which has a U-phase, V-phase, and W-phase different from each other with a 120 degree phase difference. For performing such the three-phase driving, motor 40 has windings 56 including winding 56U for driving the U-phase, winding 56V for driving the V-phase, and winding 56W for driving the W-phase.

For each phase, motor control device 10 applies a drive voltage with a predetermined waveform to corresponding winding 56. With this configuration, the rotor rotates at a rotating speed in accordance with the rotation control by motor control device 10. Moreover, in order to perform such the rotation control, motor 40 is equipped with sensors for detecting a rotating position and rotating speed of the rotor. In the embodiment, to detect the rotating position of the rotor, motor 40 is equipped with three of position detecting sensors 49, such as hall devices, with the sensors respectively corresponding to the phases. Then, motor control device 10 is supplied with sensor signal Det from position detecting sensors 49.

Moreover, as shown in FIG. 2, motor control device 10 is coupled with host ECU 20 via PWM signal line 19, for signal communication. Motor control device 10 is notified of a command for controlling the rotation of motor 40, from host ECU 20 via PWM signal line 19. In reverse, information on brushless motor 50 is notified from motor control device 10 to host ECU 20 via PWM signal line 19. The following descriptions will be made regarding the case where the command is notified from host ECU 20 to motor control device 10 of brushless motor 50.

In the embodiment, motor control device 10 is notified of a target rotating speed command, as the command from host ECU 20, which commands the target rotating speed of motor 40. Moreover, the rotating speed commanded by the target rotating speed command is notified as pulse-width modulated PWM command signal Si, via PWM signal line 19. Furthermore, the target rotating speed command as referred herein is the number of revolutions per minute (rpm), for example.

Next, a configuration of motor control device 10 will be described. As shown in FIG. 2, motor control device 10 includes rotation controller 12, PWM driving circuit 14, inverter 15, position detecting unit 16, rotating speed calculating unit 17, and PWM signal processor 30. Then, as described above, motor control device 10 is supplied with sensor signal Det from three position detecting sensors 49 disposed in motor 40. Moreover, motor control device 10 is coupled with host ECU 20 via PWM signal line 19 that transmits PWM command signal Si.

First, sensor signal Det from position detecting sensors 49 is supplied to position detecting unit 16. Position detecting unit 16 detects position information for each phase, from sensor signal Det that varies in response to variations in magnetic poles following the rotation of the rotor. For example, position detecting unit 16 detects a timing of zero crossing of sensor signal Det during the variations in the magnetic poles, and then outputs position detection signal Pd based on the thus-detected timing. That is, the rotating position of the rotating rotor corresponds to such the detected timing; therefore, the rotating position can be detected by using the detected timing. Specifically, position detection signal Pd may be a pulse signal that indicates such the detected timing, for example. Position detecting unit 16 supplies, to rotating speed calculating unit 17, position detection signal Pd corresponding to each phase.

Rotating speed calculating unit 17 calculates the rotating speed of the rotor based on the rotating position indicated by position detection signal Pd, by differential calculation or the like, for example. Rotating speed calculating unit 17 supplies the thus-calculated rotating speed, as detected rotating speed Vd, on a time series basis to rotation controller 12. Note that, in the embodiment, the description has been made using one example in which detected rotating speed Vd is generated based on sensor signal Det from position detecting sensors 49. However, the configuration may be such that a rotor speed is detected by a speed detection means and detected rotating speed Vd is generated based on the thus-detected rotor speed. That is, detected rotating speed Vd is required only to be values or signals on a time series basis that indicate the speed detected from the actual rotation of the motor.

PWM signal processor 30 receives PWM command signal Si transmitted from host ECU 20, and performs demodulation on the pulse-width modulated pulse signal. Through the demodulation, PWM signal processor 30 reconstructs target rotating speed Vr, on a time series basis, from thus-received PWM command signal Si. PWM command signal Si is a pulse signal configured with pulses having pulse widths in accordance with the rotating speed commanded by host ECU 20, i.e. the target rotating speed command. PWM signal processor 30 demodulates PWM command signal Si by detecting either the pulse width of each pulse of PWM command signal Si or a duty ratio corresponding to the pulse width. Then, PWM signal processor 30 outputs, on a time series basis, target rotating speed Vr thus-reconstructed by the demodulation. Through the operations of PWM signal processor 30 in this way, the target rotating speed command from host ECU 20 is reconstructed as target rotating speed Vr.

Target rotating speed Vr is supplied to rotation controller 12. In addition, rotation controller 12 is supplied with detected rotating speed Vd that is calculated by rotating speed calculating unit 17. Rotation controller 12 generates driving value Dd that indicates an amount of driving of winding 56, based on both target rotating speed Vr and detected rotating speed Vd. Specifically, rotation controller 12 determines a speed deviation between target rotating speed Vr that indicates the speed command and detected rotating speed Vd that indicates the detected speed corresponding to the actual speed. Then, rotation controller 12 generates driving value Dd that indicates an amount of torque in accordance with the speed deviation such that the actual speed will follow the speed command. Rotation controller 12 supplies such driving value Dd to PWM driving circuit 14.

PWM driving circuit 14 generates a driving waveform to drive winding 56 for each phase, and performs pulse-width modulation using each of the generated driving waveforms to output as drive pulse signal Dp. In the case where winding 56 is driven by sinusoidal wave driving, the driving waveform is a sinusoidal waveform, while in the case by rectangular wave driving, the driving waveform is a rectangular waveform. Moreover, the amplitude of the driving waveform is determined in accordance with driving value Dd. PWM driving circuit 14 performs the pulse-width modulation using the driving waveform generated for each phase as a modulating signal, and then supplies drive pulse signal Dp, pulse-width modulated using the driving waveform, in a pulse train to inverter 15.

Inverter 15 passes electric current through winding 56 for each phase based on drive pulse signal Dp, so as to energize winding 56 to drive. Inverter 15 is equipped with both a switch element coupled with the positive terminal of the power supply and a switch element coupled with the negative terminal, for each of the U-phase, V-phase, and W-phase. Driving output Uo of the U-phase, driving output Vo of the V-phase, and driving output Wo of the W-phase are coupled with winding 56U, winding 56V, and winding 56W, respectively. In each of the phases, the switch elements are turned ON and OFF in accordance with drive pulse signal Dp. Then, via the switch being ON to the power supply, a driving voltage is further supplied to winding 56 from the driving output. The supply of the driving voltage causes a driving current to pass through winding 56. Here, because drive pulse signal Dp is the signal of the pulse-width modulated driving waveforms, each of windings 56 is energized by the driving current in accordance with the respective driving waveform.

Moreover, energization driving unit 13 is configured with PWM driving circuit 14 and inverter 15. As described above, energization driving unit 13 energizes winding 56 of motor 40 to drive, for each phase, based on driving value Dd.

With the configuration described above, a feedback control loop is formed which controls the rotating speed of the rotor to follow target rotating speed Vr.

Figure 3:
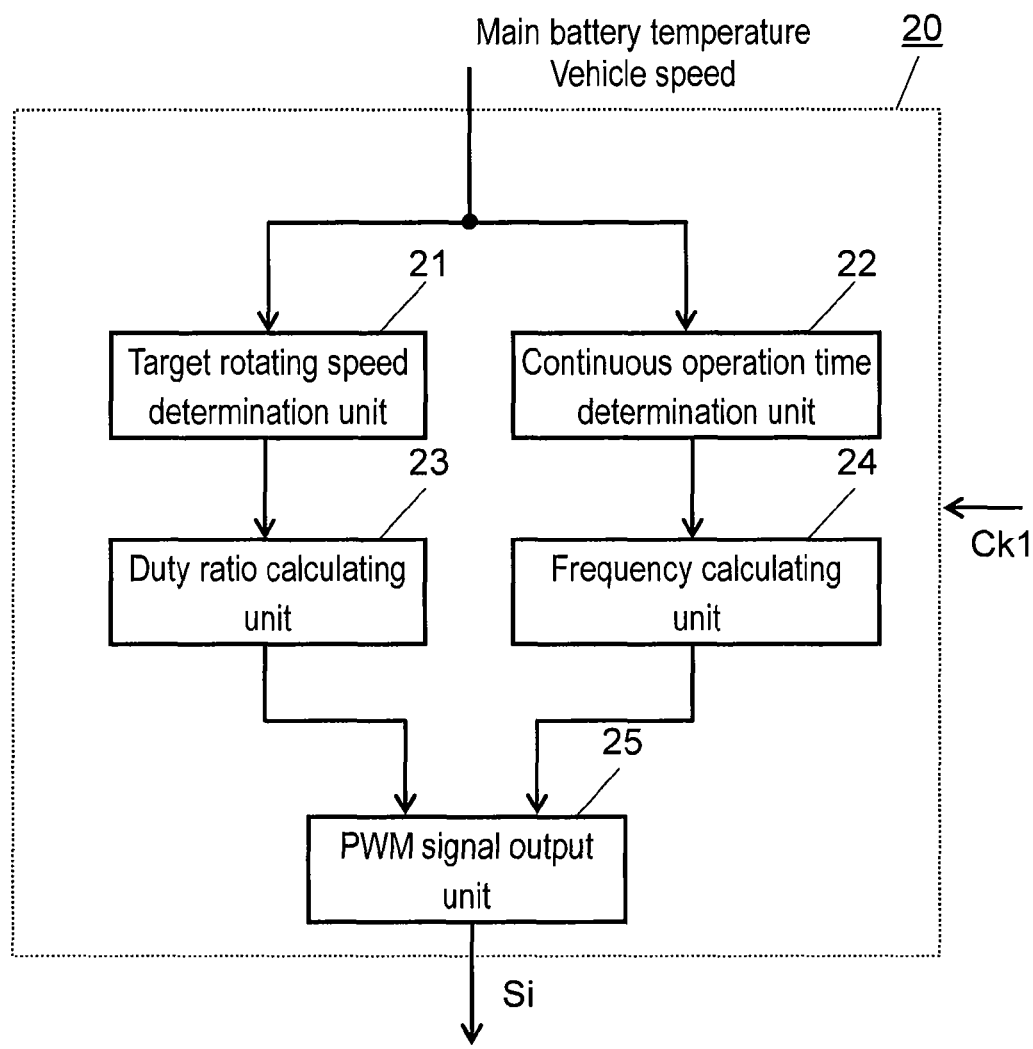
FIG. 3 is a functional block diagram of a host ECU according to the embodiment of the invention.
Figure 4:
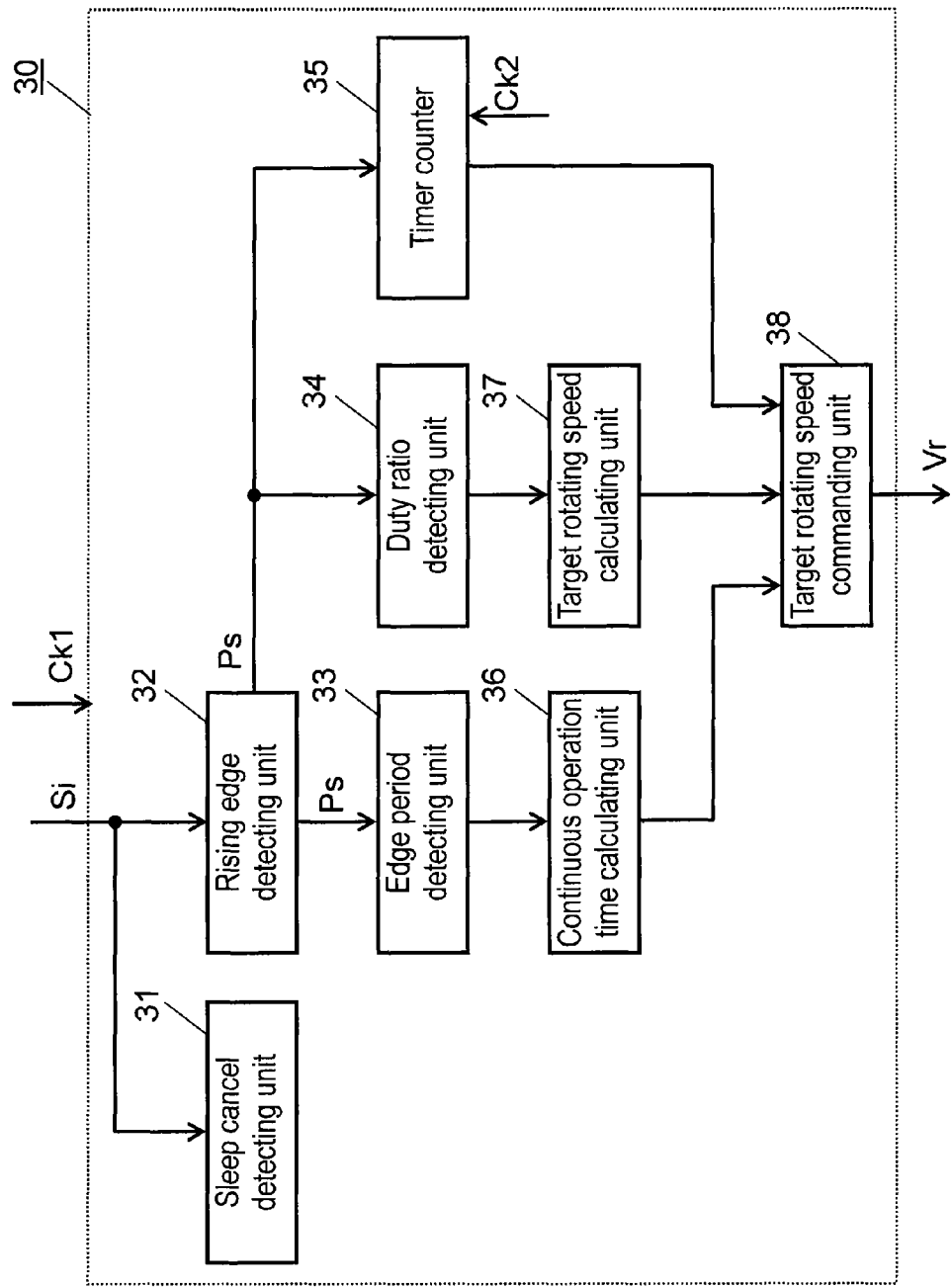
FIG. 4 is a functional block diagram of a PWM signal processor according to the embodiment of the invention.
Figure 5:
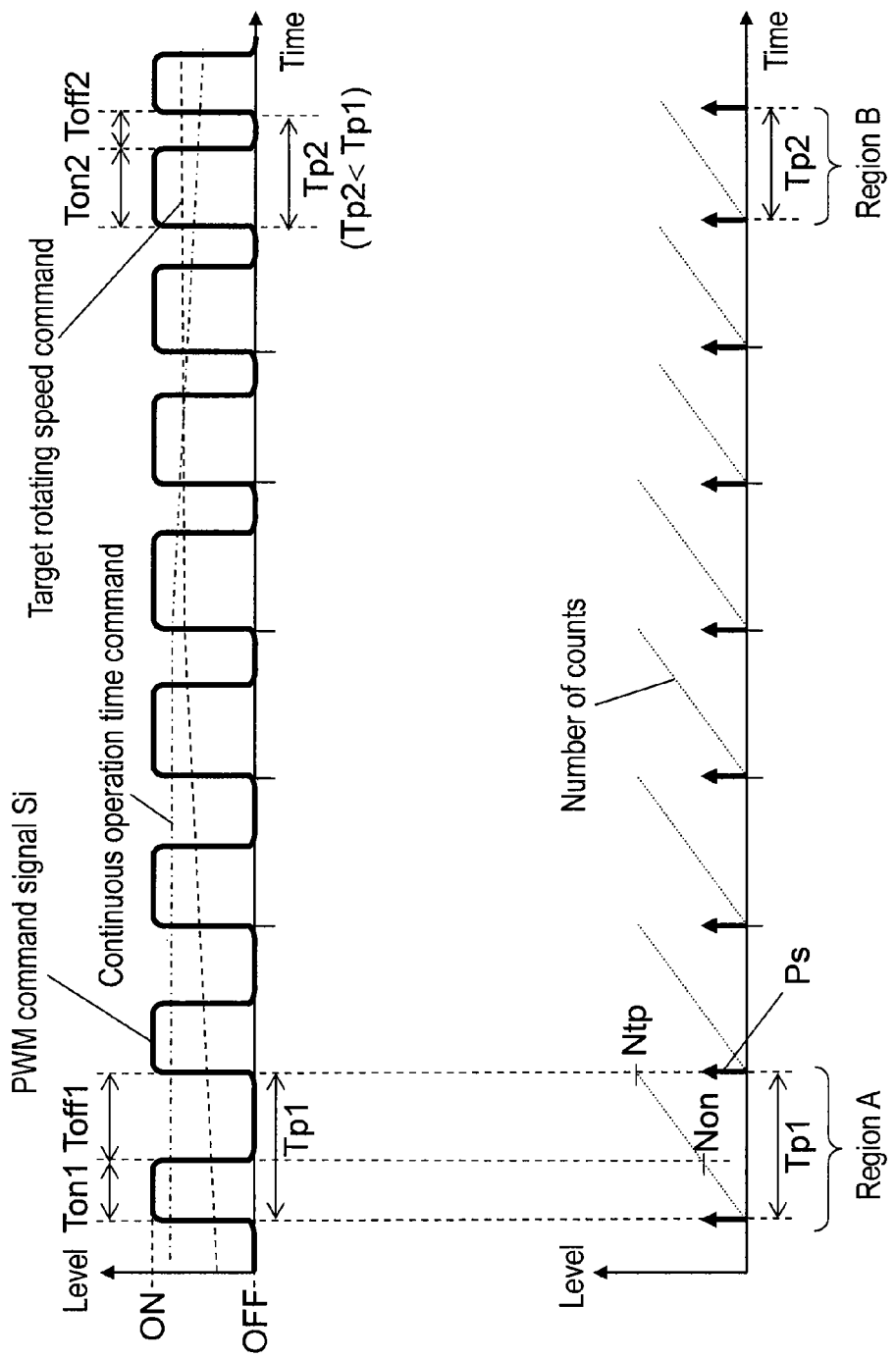
FIG. 5 is a signal waveform chart for illustrating operations of the PWM signal processor according to the embodiment of the invention.

Next, descriptions will be made regarding detailed configurations of both host ECU 20 and PWM signal processor 30 of motor control device 10, with reference to FIGS. 3 to 5. FIG. 3 is a functional block diagram of host ECU 20 according to the embodiment of the invention. FIG. 4 is a functional block diagram of PWM signal processor 30 according to the embodiment of the invention. FIG. 5 is a signal waveform chart for illustrating operations of the PWM signal processor according to the embodiment of the invention. Note, however, that FIG. 3 shows the configuration involved only in the controlling of cooling blower 8.

As shown in FIGS. 3 and 4, host ECU 20 and PWM signal processor 30 are supplied with clock signal Ck1. Clock signal Ck1 is a pulse signal with a constant period and a frequency sufficiently higher than that of PWM command signal Si. For example, the frequency of PWM command signal Si is 500 Hz, and the frequency of clock signal Ck1 is 1 MHz. Moreover, in the configuration shown in FIG. 3, an example of the configuration is described in which the PWM signal is generated by utilizing a counter that counts clock signal Ck1.

First, referring to FIGS. 3 and 5, a configuration and operations of host ECU 20 are described. FIG. 5 shows a principal part of a signal waveform and timing of motor control device 10. In the upper row of FIG. 5, a solid line represents the signal waveform of PWM command signal Si, a dashed line represents the target rotating speed command, and a dot-and-dash line represents a continuous operation time command. In the lower row of FIG. 5, a solid line represents a timing of signal Ps that shows starting of the pulses.

As shown in FIG. 3, host ECU 20 includes target rotating speed determination unit 21, continuous operation time determination unit 22, duty ratio calculating unit 23, frequency calculating unit 24, and PWM signal output unit 25. Target rotating speed determination unit 21 determines the target rotating speed of motor 40 based on the temperature of main battery 2 informed from temperature sensor 6 and on the vehicle speed informed from the vehicle speed sensor, and then supplies the target rotating speed command to duty ratio calculating unit 23. Duty ratio calculating unit 23 calculates the pulse width of each pulse of the PWM modulated signal in accordance with the target rotating speed command, and then supplies the result to PWM signal output unit 25. Here, the target rotating speed as referred herein is the number of revolutions per unit time. By changing the duty ratio, the target revolution number (rpm) is changed within a range from 10% to 90%. Similarly, continuous operation time determination unit 22 determines the continuous operation time of motor 40, i.e. the time period from the turning OFF of IG switch 5 to the halting of the rotation of motor 40, based on the temperature of main battery 2 informed from temperature sensor 6 and on the vehicle speed informed from the vehicle speed sensor. Then the continuous operation time determination unit 22 supplies the continuous operation time command to frequency calculating unit 24. Frequency calculating unit 24 calculates the frequency, i.e. the period of each pulse, of the PWM modulated signal in accordance with the continuous operation time command, and then supplies the result to PWM signal output unit 25. The frequency is changed in a range of 400 Hz to 500 Hz, for example. Then, corresponding to this frequency change, the continuous operation time is changed in a range of one minute to 10 minutes, for example.

Next, with reference to FIG. 4, a configuration and operations of PWM signal processor 30 will be described in detail. FIG. 4 shows the configuration related only to the demodulation of PWM command signal Si. PWM signal processor 30 includes sleep cancel detecting unit 31, rising edge detecting unit 32, edge period detecting unit 33, duty ratio detecting unit 34, timer counter 35 serving as a time measuring unit, continuous operation time calculating unit 36, target rotating speed calculating unit 37, and target rotating speed commanding unit 38.

PWM signal processor 30 receives PWM command signal Si from host ECU 20, and supplies it to both sleep cancel detecting unit 31 and rising edge detecting unit 32. PWM command signal Si is a pulse train with period Tp (Tp1 or Tp2), as shown in the upper row of FIG. 5. Each of the period Tp periods is configured with ON time period Ton (Tpon1 or Tpon2) for a high level and OFF time period Toff (Tpoff1 or Tpoff2) for a low level. Period Tp is modulated by the continuous operation time. Moreover, the duty ratio (Ton/Tp), a ratio of ON time period Ton to period Tp, is modulated by the target rotating speed. That is, PWM signal processor 30 can reconstruct the continuous operation time by detecting period Tp, and can reconstruct the target rotating speed by detecting the duty ratio, i.e. the ratio of ON time period Ton to the period Tp period.

For example, as shown in the upper row of FIG. 5, in region A where the target rotating speed command is in the low level (a command to reduce the target rotating speed, for example) and the continuous operation time command is in the high level (a command to increase the continuous operation time, for example), PWM signal output unit 25 generates PWM command signal Si that is a pulse train signal where the pulse period is Tp1, the ON time period is Ton1, and the OFF time period is Toff1. Then, the generated signal Si is transmitted to PWM signal processor 30. On the other hand, in region B where the target rotating speed command is higher in level than that of region A and the continuous operation time command is lower in level than that of region A, PWM signal output unit 25 generates PWM command signal Si where the pulse period is Tp2 (Tp2<Tp1), the ON time period is Tong, and the OFF time period is Toff2 (Ton2/Tp2>Ton1/Tp1), for example. Then, the generated signal Si is transmitted to PWM signal processor 30. Note, however, that the aforementioned relation of each of the target rotating speed command and the continuous operation time command to each of the levels, pulse periods Tp, and duty ratios (Ton/Tp) is nothing more than an example, and it should be understood that the embodiment is not limited to it.

Sleep cancel detecting unit 31 detects a rising or falling edge of PWM command signal Si. When the edge is detected during a sleep mode of the microcomputer configuring PWM signal processor 30, the microcomputer cancels its own sleep mode.

Rising edge detecting unit 32 detects the timing of a rising edge from OFF to ON for each pulse of PWM command signal Si, and generates edge detection signal Ps based on the timing. As shown in the lower row of FIG. 5, the timing of edge detection signal Ps corresponds to the starting timing of each of the pulses configuring PWM command signal Si. Thus generated edge detection signal Ps is supplied to edge period detecting unit 33, duty ratio detecting unit 34, and timer counter 35. In the embodiment, rising edge detecting unit 32 is used capable of performing such the operation, as an example of an edge timing detecting unit which detects the timing of an edge that changes in a predetermined direction.

Edge period detecting unit 33 detects the period of edge detection signal Ps that is sequentially supplied from rising edge detecting unit 32. In the exemplified configuration, edge period detecting unit 33 includes a counter which counts the number of clock signal Ck1. Then, the counter counts the number of the clocks between edge detection signals Ps, thereby detecting the period of edge detection signals Ps. The counter of edge period detecting unit 33 performs such the operation to detect number of counts Ntp in the period of period Tp, as shown in the lower row of FIG. 5. Thus-detected number of counts Ntp corresponds to period Tp of each of the pulses configuring PWM command signal Si. Number of counts Ntp is supplied to continuous operation time calculating unit 36. Continuous operation time calculating unit 36 calculates the continuous operation time of motor 40 from number of counts Ntp, and then supplies it to target rotating speed commanding unit 38.

In the exemplified configuration, duty ratio detecting unit 34 includes a counter which counts the number of clock signal Ck1. As shown in the lower row of FIG. 5, the counter of duty ratio detecting unit 34 starts the counting at the timing of edge detection signal Ps, and continues the counting during ON time period Ton of PWM command signal Si to detect number of counts Non of ON time period Ton. Moreover, duty ratio detecting unit 34 calculates a ratio of number of counts Non to number of counts Ntp. The ratio corresponds to the duty ratio of PWM command signal Si. Duty ratio detecting unit 34 supplies the ratio to target rotating speed calculating unit 37. Target rotating speed calculating unit 37 reconstructs the target rotating speed from the duty ratio.

Timer counter 35 is a counter which is reset upon receiving edge detection signal Ps from rising edge detecting unit 32. That is, timer counter 35 measures a signal-unreceiving time period during which no pulse of PWM command signal Si is input, and supplies the measured signal-unreceiving time period to target rotating speed commanding unit 38.

Target rotating speed commanding unit 38 receives the output from each of continuous operation time calculating unit 36, target rotating speed calculating unit 37, and timer counter 35, and finally determines the target rotating speed to supply target rotating speed Vr to rotation controller 12.

In the case of IG switch 5 being ON, assuming that number of counts Ntp is 2000 and number of counts Non is 1000, for example, then the ratio is 0.5, resulting in the duty ratio of 50%. Target rotating speed commanding unit 38 reconstructs target rotating speed Vr in such a manner that, for example, target rotating speed Vr is 1000 (rpm) for a 50% duty ratio and 500 (rpm) for a 25% duty ratio.

On the other hand, when IG switch 5 becomes in the OFF state, the power supply to host ECU 20 is halted, resulting in a halt of the transmission of PWM command signal Si from host ECU 20. In this state, when the signal-unreceiving time period, i.e. the output from timer counter 35, becomes larger than continuous operation time Tc, i.e. the output from continuous operation time calculating unit 36, the target rotating speed commanding unit 38 operates such that target rotating speed Vr is set equal to "zero." That is, motor control device 10 controls motor 40 to halt its rotation.

Figure 6:
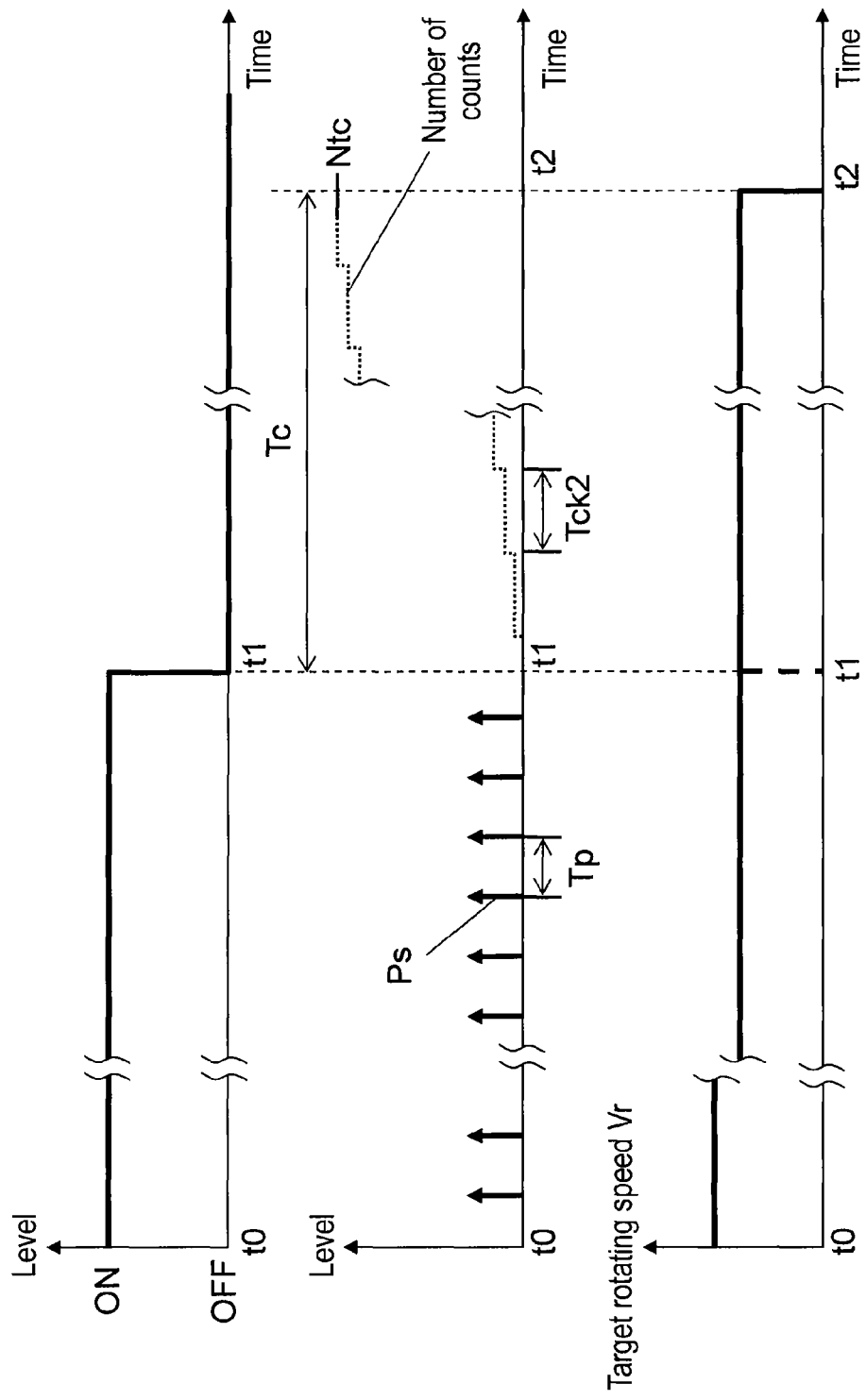
FIG. 6 is a signal waveform chart for illustrating the operations of the PWM signal processor according to the embodiment of the invention.

Next, operations of target rotating speed commanding unit 38 will be described in more detail with reference to FIG. 6. FIG. 6 is a signal waveform chart for illustrating the operations of the PWM signal processor according to the embodiment of the invention.

FIG. 6 shows variations in target rotating speed Vr before and after IG switch 5 is turned OFF. The upper row of FIG. 6 shows the state where IG switch 5 is turned from ON to OFF. The middle row of FIG. 6 shows rising edge detection signal Ps of PWM command signal Si. The lower row of FIG. 6 shows the variations in target rotating speed Vr.

Timer counter 35 is configured with the counter. The frequency of clock Ck2 supplied to the counter may be higher or lower than that of PWM command signal Si; the frequency is only required to be enough to count the continuous operation time. In the embodiment, descriptions are made for the case where the frequency of clock Ck2 is lower than that of PWM command signal Si. Moreover, let Ntc be the number of counts corresponding to reconstructed continuous operation time Tc.

The counter of timer counter 35 is configured such that the counter is reset by rising edge detection signal Ps and then counts input clock Ck2. As shown in FIG. 6, period Tck2 of clock Ck2 is longer than period Tp of rising edge detection signal Ps. Assuming that IG switch 5 is turned from ON to OFF at time t1, when IG switch 5 is ON (t0<t<t1), timer counter 35 is reset before the counter starts counting; therefore, the output of timer counter 35 is equal to not larger than one. On the other hand, after IG switch 5 has been turned OFF (t≥t1), PWM command signal Si is no longer input; therefore, rising edge detection signal Ps disappears. In this case, because timer counter 35 is not reset, timer counter 35 counts clock Ck2. When the output of timer counter 35 becomes larger than number of counts Ntc corresponding to the continuous operation time (t≥t2), target rotating speed Vr is set equal to "zero," and at the same time the microcomputer of PWM signal processor 30 is set in a sleep mode.

With this operation, it is possible to halt motor 40 of cooling blower 8 after the motor has been allowed to operate at an appropriate rotating speed for an appropriate time period, based on such as the temperature of main battery 2 and the vehicle speed immediately before IG switch 5 is turned OFF.

Note that, in the above descriptions, although PWM signal processor 30 has been described using one example of the configuration that uses the counter or the like, it is also possible to configure the processor using a microcomputer or the like. That is, the configuration may be such that a program is installed which has the same functions as those of PWM signal processor 30 as described above, and the processes described above are performed with the program. Moreover, in the exemplary configuration described above, the descriptions have been made using one example where the pulse widths in the ON time periods are modulated relative to the rising edges of the pluses. However, the configuration may be such that a modulation is performed relative to the falling edges of the pluses, or performed on the pulse widths in the OFF time periods. In short, in PWM signal processor 30, it is only required for the configuration to be capable of correctly reconstructing the pulse period and the duty ratio from received PWM command signal Si.

Next, a detailed configuration of brushless motor 50 will be described.

Figure 7:
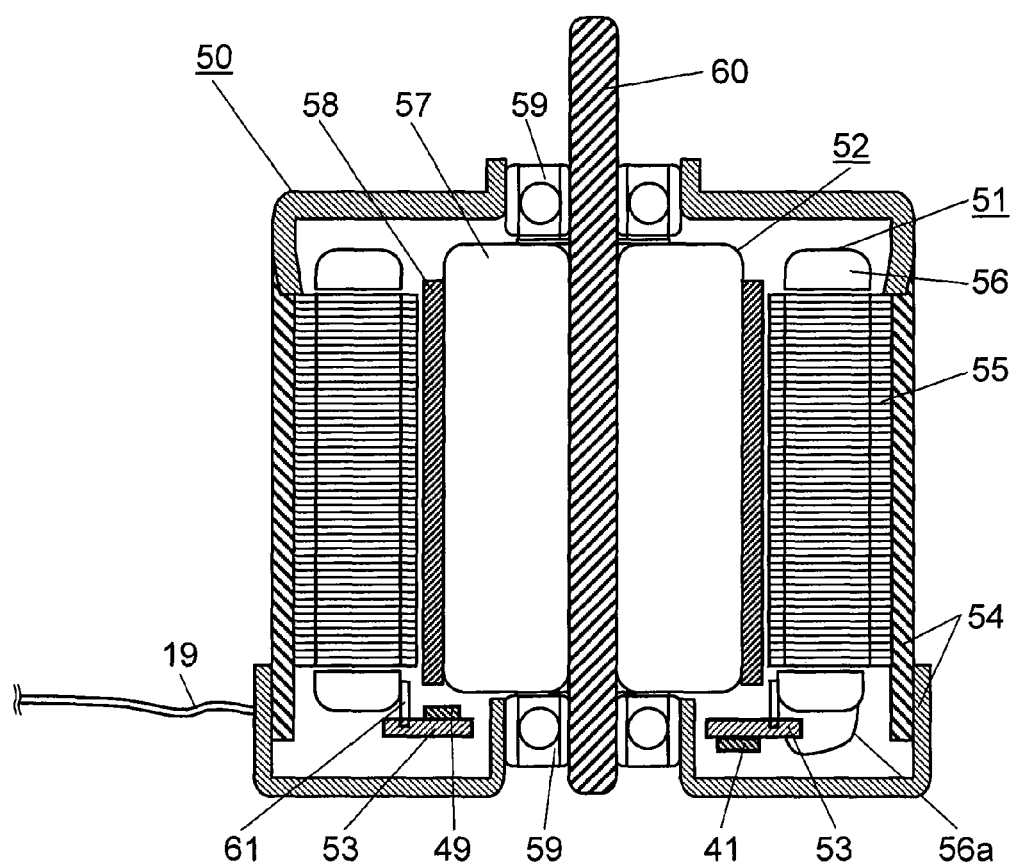
FIG. 7 is a cross sectional view of a brushless motor according to the embodiment of the invention.

FIG. 7 is a cross sectional view of brushless motor 50 according to the embodiment of the present invention. In the embodiment, descriptions are made using an example of inner rotor type brushless motor 50 in which a rotor is rotatably disposed in the inner peripheral side of a stator.

As shown in FIG. 7, brushless motor 50 includes stator 51, rotor 52, circuit board 53, and motor case 54. Motor case 54 is formed with a metal cylinder which is hermetically sealed. Brushless motor 50 is configured such that motor case 54 accommodates stator 51, rotor 52, and circuit board 53.

In FIG. 7, stator 51 is configured such that winding 56 for each phase is wound on stator iron core 55. Stator iron core 55 includes a plurality of salient poles which protrude toward the inner peripheral side of the core. Moreover, the outer peripheral side of stator iron core 55 has an approximately cylindrical shape, and the outer periphery thereof is secured to motor case 54. In the inside of stator 51, rotor 52 is inserted with a gap. Rotor 52 holds cylindrical permanent magnet 58 at the outer periphery of rotor frame 57 and is rotatably disposed about rotary shaft 60 supported by shaft bearing 59. That is, the end surfaces of the salient poles and the outer peripheral surface of permanent magnet 58 are disposed to face each other. Motor 40 is configured with such stator 51 and rotor 52 supported by shaft bearing 59.

Moreover, brushless motor 50 accommodates, in the inside of motor case 54, circuit board 53 on which various circuit components 41 are mounted. These circuit components 41 specifically configure motor control device 10 to control and drive motor 40. Moreover, on circuit board 53, position detecting sensors 49 configured with such as hall devices are also mounted to detect the rotating position of rotor 52. Stator iron core 55 is equipped with support member 61, and circuit board 53 is secured in the inside of motor case 54 via support member 61. Then, the end parts of each of windings 56U, 56V, and 56W are drawn from stator 51, as lead wires 56a. Lead wires 56a of the each are coupled with circuit board 53.

Moreover, from brushless motor 50, PWM signal line 19 coupled with host ECU 20 is drawn.

For thus-configured brushless motor 50, the power supply voltage and PWM command signal Si are supplied from the outside to allow motor control device 10 configured on circuit board 53 to pass the driving current through windings 56, which results in the generation of a magnetic field from stator iron core 55. Then, both the magnetic field from stator iron core 55 and the magnetic field from permanent magnet 58 generate an attractive force or a repulsive force in accordance with the polarities of these magnetic fields, which causes rotor 52 to rotate about rotary shaft 60.

As described above, in motor control system 1 and motor control device 10 according to the embodiment, there is no need for any relay disposed exclusively for host ECU 20 and cooling blower 8. No serial communication for changing modes and setting speed/time is needed between host ECU 20 and motor control device 10 of cooling blower 8. Accordingly, it is possible to provide motor control device 10 by using cheap components, a microcomputer with low specifications, and the like. Moreover, this also eliminates the need for electronic components (CAN transceivers, choke coils, high precision clocks, etc.) used for the serial communication. This allows cost reduction of motor control system 1. Furthermore, after a lapse of the continuous operation time following the turning OFF of IG switch 5, motor control device 10 shifts to the sleep mode, resulting in a large reduction in the dark current thereof during a stop of the vehicle. This allows an improvement in fuel efficiency and travel distance of hybrid vehicles.

INDUSTRIAL APPLICABILITY

The motor control system, motor control device, and brushless motor according to the present invention are preferably used in cooling blowers incorporated in vehicles. In particular, they are useful for the cooling blowers incorporated in hybrid vehicles and electric ones which operate with a large battery.

The invention claimed is:

1. A motor control system comprising:
a host controller for controlling a wheel driving unit of a vehicle, wherein electric power supply to the controller is halted when an ignition switch is OFF; and
a motor control device for receiving a PWM command signal from the host controller and for controlling a motor of a cooling blower to cool a power supply unit supplying electric power to the wheel driving unit,
wherein
the host controller modulates a duty ratio of pulses of the PWM command signal by a target rotating speed of the motor, modulates a period of the pulses of the PWM command signal by a continuous operation time of the motor, and transmits the modulated PWM command signal to the motor control device; and
the motor control device demodulates the received PWM command signal to reconstruct both the target rotating speed and the continuous operation time, controls a rotating speed of the motor based on the target rotating speed, and controls the motor to halt rotation when a signal-unreceiving time period of the PWM command signal becomes larger than the continuous operation time.

2. A motor control device for receiving a PWM command signal from a host controller and for controlling a motor of a cooling blower, the motor control device comprising:
a PWM signal processor for outputting a target rotating speed based on the PWM command signal;
a position detecting unit for detecting a rotating position of a rotor of the motor and for outputting a position detection signal;
a rotating speed calculating unit for calculating a rotating speed of the motor based on the position detection signal and for outputting a detected rotating speed;
a rotation controller for outputting a driving signal based on both the target rotating speed and the detected rotating speed; and
an energization driving unit for energizing the motor to drive based on the driving signal,
wherein
the PWM signal processor reconstructs the target rotating speed from a duty ratio of pulses of the PWM command signal, reconstructs a continuous operation time from a period of the pulses of the PWM command signal, and supplies the target rotating speed with which rotation of the motor is halted to the rotation controller when a signal-unreceiving time period of the PWM command signal becomes larger than the continuous operation time.

3. The motor control device according to claim 2, wherein the PWM signal processor includes:
a period detecting unit for detecting the period of the pulses of the PWM command signal;
a duty ratio detecting unit for detecting the duty ratio of the pulses of the PWM command signal;
a continuous operation time calculating unit for calculating the continuous operation time based on the period of the pulses;
a target rotating speed calculating unit for calculating the target rotating speed based on the duty ratio of the pulses;
a time measuring unit for measuring the signal-unreceiving time period during which the PWM command signal is not input; and a target rotating speed commanding unit for outputting the target rotating speed with which rotation of the motor is halted when the signal-unreceiving time period becomes larger than the continuous operation time.

4. A brushless motor comprising:
a rotor;
a stator including a three-phase winding; and
the motor control device according to claim 2 for energizing and driving the winding.

5. A brushless motor comprising:
a rotor;
a stator including a three-phase winding; and
the motor control device according to claim 3 for energizing and driving the winding.

\* \* \* \* \*